May 13, 1930.  H. M. CAMERON  1,758,648
COUNTING DEVICE FOR SCALES
Filed Aug. 20, 1927   3 Sheets-Sheet 1
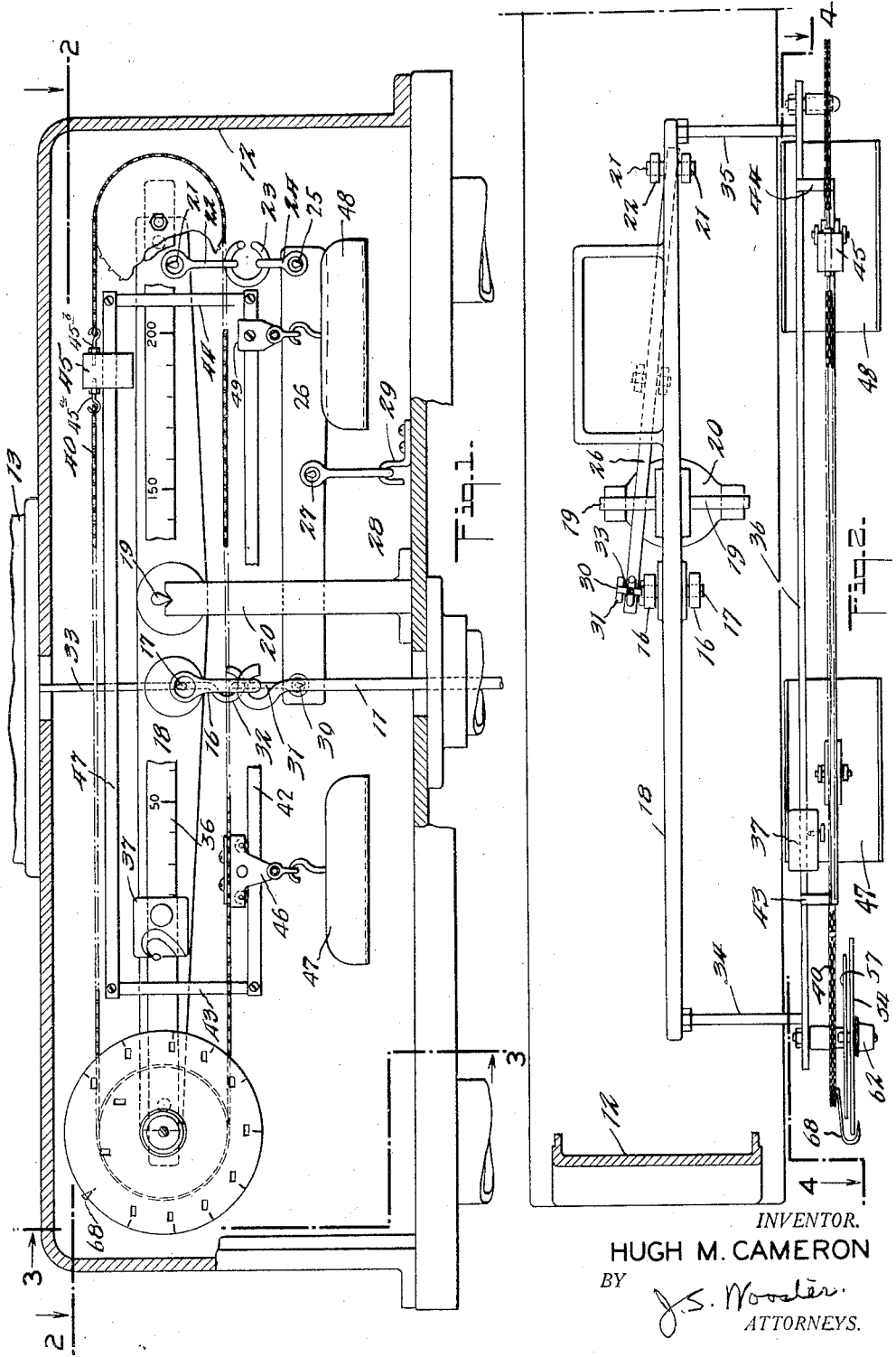
INVENTOR.
HUGH M. CAMERON
BY J. S. Wooster
ATTORNEYS.

May 13, 1930. H. M. CAMERON 1,758,648
COUNTING DEVICE FOR SCALES
Filed Aug. 20, 1927 3 Sheets-Sheet 2
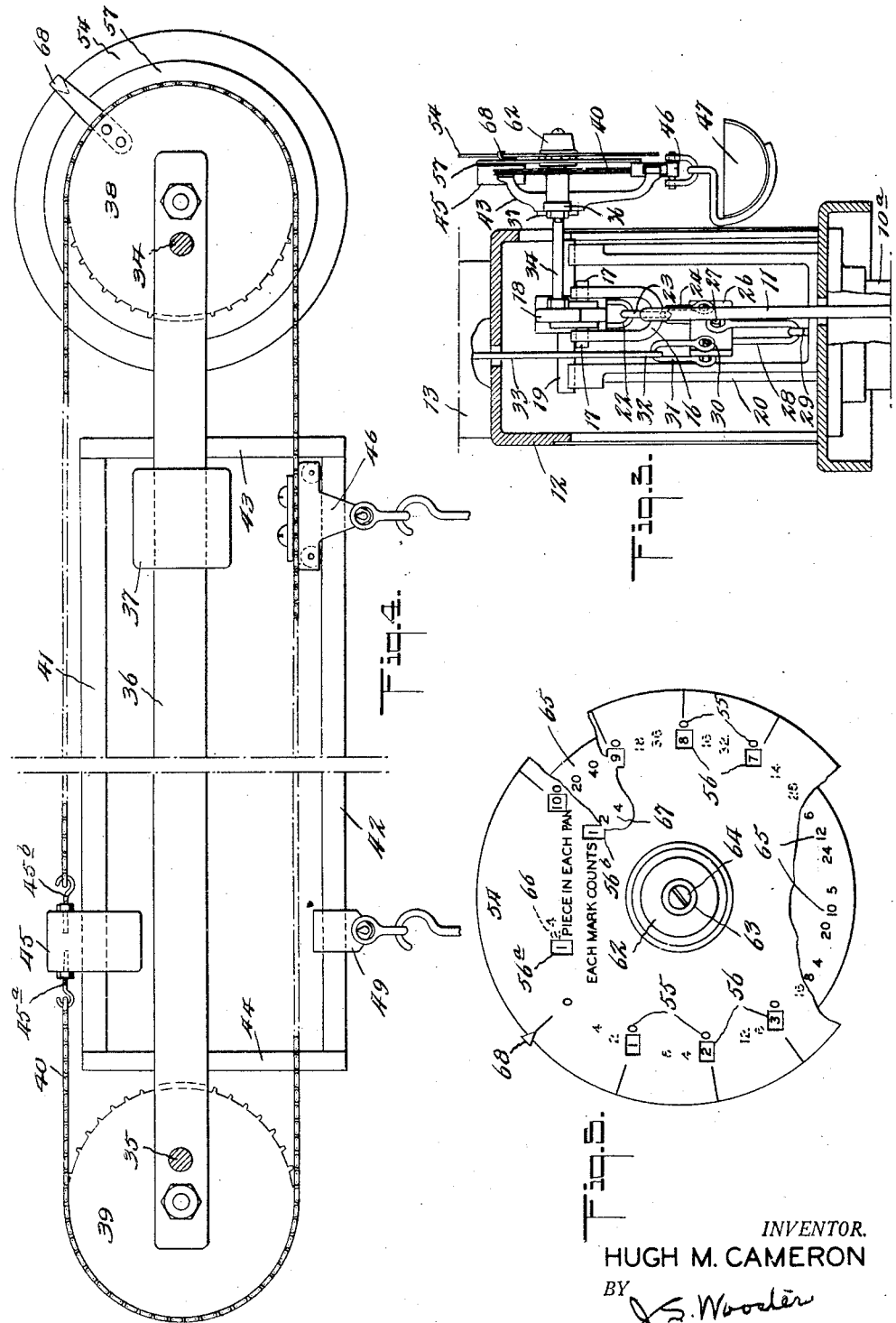
INVENTOR.
HUGH M. CAMERON
BY
J.S. Wooster
ATTORNEYS.

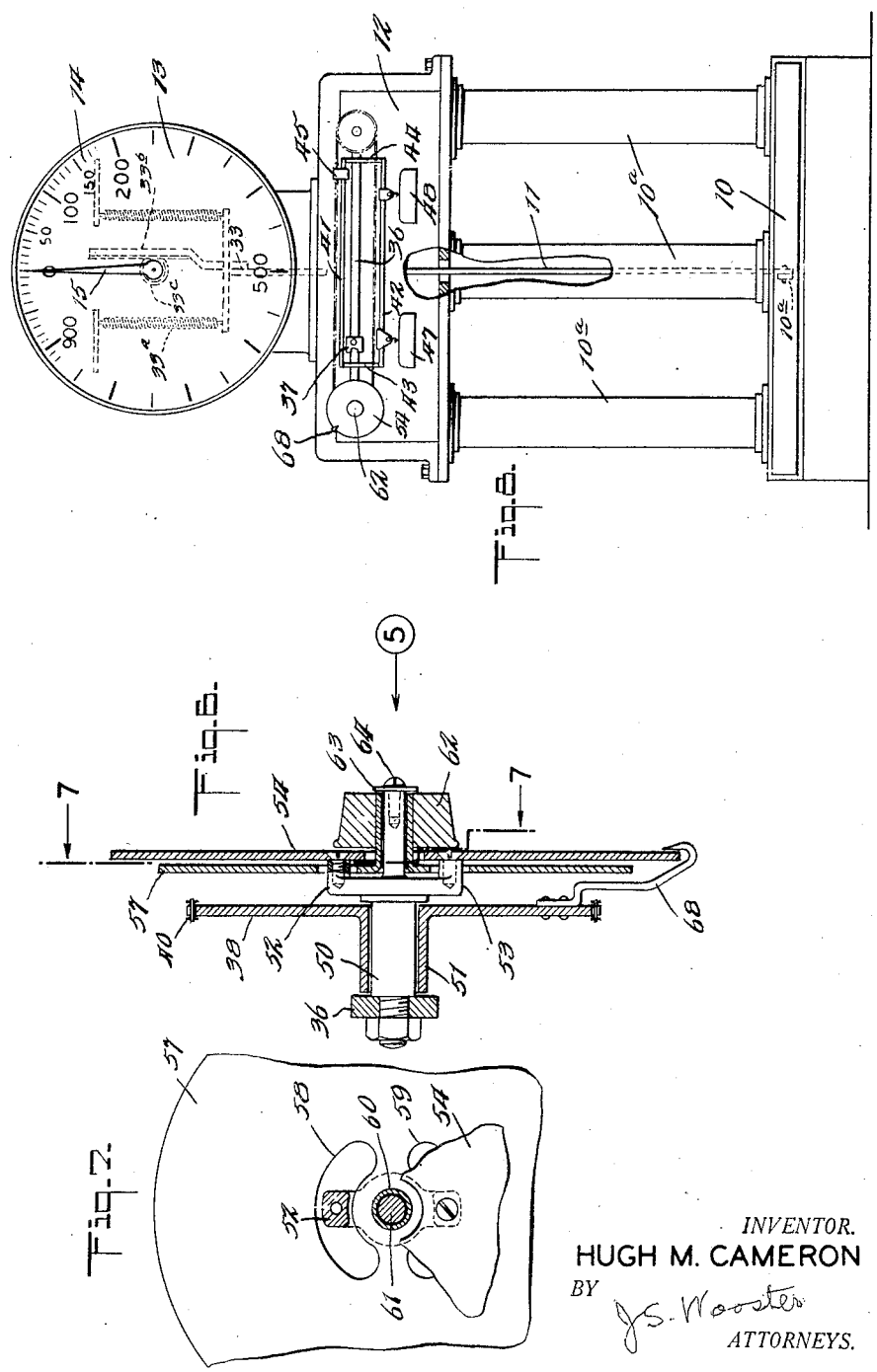

Patented May 13, 1930

1,758,648

UNITED STATES PATENT OFFICE

HUGH M. CAMERON, OF WOODHAVEN, NEW YORK, ASSIGNOR TO JOHN CHATILLON & SONS, OF NEW YORK, N. Y., A CORPORATION OF NEW YORK

COUNTING DEVICE FOR SCALES

Application filed August 20, 1927. Serial No. 214,305.

This invention relates to so called counting scales by which a relatively large number of articles can be balanced against a smaller number of articles of the same kind.

By means of the invention, I aim to provide an improvement over counting scales of known types to simplify the construction, make the scale more compact, and provide a counting mechanism which can be readily attached to many scales without any material alteration of the scale construction.

Another object is to so connect a weight indicating means to the lever system of the weighing mechanism that a more sensitive and effective transmission of force to the indicating means is achieved.

The invention in general comprises a weight indicating means such as a dial of any desired construction, connected by a lever of the first order to a weighing beam which is also preferably of the first order. This weighing beam is connected by suitable leverage to a weight support, which may be of the usual platform type. A counting mechanism is connected directly to the weighing beam and is entirely supported thereby, no other connection existing between the weighing mechanism and the counting mechanism except through the beam, so that substantially no alteration of the weighing mechanism is necessary to adapt it for counting.

The counting mechanism generally comprises a fixed weight pan, a movable weight pan, and a balance weight, the latter two of which are connected to and moved by a connecting member such as a chain running over suitable members such as sprockets disposed at the ends of the weighing beam, the movable pan and balance weight riding on guides or tracks. A pointer connected to one of the sprockets is moved over a scale of graduations on a fixed disc mounted on the beam coaxial with this sprocket. The graduations on this disc represent the total number of articles on the platform, the exact number being denoted on the scale where the pointer stops when the main beam is balanced. The fixed disc is provided with a series of apertures disposed at intervals with respect to the graduations thereon. Back of the fixed disc is mounted a rotatable disc having thereon a plurality of sets of graduations representing different valuations for the totals on the fixed disc when different numbers of articles are placed in the pans. These graduations on the rotatable disc are adapted to be moved into position to be seen through the apertures on the fixed disc. The rotatable disc is intended to be set to cover a counting range according to the approximate number of articles to be counted after which this setting is not disturbed and the pointer will at once indicate the total. As larger or smaller numbers of articles are to be counted, the rotatable disc is set accordingly.

The invention is illustrated in the drawings, of which

Fig. 1 is a partial side elevation with the casing broken away.

Fig. 2 is a horizontal section taken on the line 2—2 of Fig. 1.

Fig. 3 is a vertical section taken on the line 3—3 of Fig. 1.

Fig. 4 is a vertical section taken on the line 4—4 of Fig. 2.

Fig. 5 is a front elevation of the counting disc, as indicated by the arrow in Fig. 6, showing part of the front disc broken away.

Fig. 6 is a vertical transverse section taken through the counting discs and their cooperating parts.

Fig. 7 is a section taken on the line 7—7 of Fig. 6.

Fig. 8 is a front elevation of the entire device showing a portion of the pedestal and casing broken away.

The apparatus comprises, a platform 10 mounted on a base from which extend upwardly pedestal members 10$^a$. The platform is provided with any suitable levers, one of which is numbered 10$^a$, connecting to an operating rod 11 extending upwardly through one of the pedestal members into a casing 12. On top of the casing is disposed a dial 13, housing a spring dial arrangement of any standard type. The dial is provided with weight graduations 14 and with an indicator arm 15. The upper hooked end of rod 11 is connected to a yoke member 16 engaging with bearing members 17 on the main weighing beam 18, which is a first class lever pivoted at 19 by bearings on the post 20 extending upwardly from the bottom of the casing 12. The end of the main beam 18, opposite the bearings 17, is provided with bearings 21 and pivotally engageable by a yoke member 22, in turn engageable by a ring 23 supporting a yoke 24 pivotally engageable with bearings 25 on the end of a first class lever 26 acting as a secondary beam. The secondary beam is provided near its mid point with bearings 27 supporting a yoke member 28 loosely engageable with a bracket member 29 on the bottom of the casing 12. The other end of the secondary beam 26 is provided with bearings 30 engageable with a yoke member 31 which in turn engages with a yoke member 32 engaging a rod 33 extending upwardly through the top of the casing into the housing of the dial 13 and engaging with the spring dial operating mechanism, which comprises the springs 33$^a$, the rack 33$^b$ and the pinion 33$^c$, fastened to the shaft of the indicator arm 15.

Connected to the ends of the main beam 18 and extending forwardly through a slot in the front of the casing 12 are bolts 34 and 35, connected at their forward ends to a graduated weighing bar 36 on which the usual slidable weight 37 is disposed. Rotatably connected to the ends of the bar 26 are sprocket gears 38 and 39 connected by a chain 40. Track members 41 and 42 are disposed respectively above and below the beam 36 and supported slightly in front thereof by means of bracket members 43 and 44; on the upper track 41 a balance weight 45 is disposed to slide. This weight is connected to opposite ends of chain 40 by means of hooks 45$^a$ and 45$^b$ which are adjustable to take up any slack in the chain 40. On the lower track member 42 a carriage 46, connected to the chain 40, is adapted to move and support an article pan 47. Another article pan 48 is supported from a bracket member 49 which is preferably adjustable although normally fixed in a definite position near the other end of member 42.

To one end of the bar 36, a stub shaft 50 is connected. It is on this stub shaft that the sprocket 38 is mounted, said sprocket having a sleeve 51 rotatably surrounding the stub shaft. The front end of the stub shaft is arranged in the form of forked arms 52 and 53, to the front of which a disc 54 is fixed by any suitable means such as screws. The disc 54 is provided with a series of graduations 55 adjacent a series of annularly disposed apertures 56. The disc is also provided with two additional apertures 56$^a$ and 56$^b$. Back of the disc 54, (see Figs. 5, 6 and 7) is disposed a movable disc 57. This disc is provided with circular slots 58 and 59 through which the ends of the forked arms 52 and 53 extend. The disc 57 is provided with a sleeve 60 extending forwardly through a central aperture in the disc 54 and surrounding an extension 61 of the shaft 50. A knob 62 is fastened to the sleeve 60 to operate it and the disc 57 and the knob is held in place by means of a cap 63 and a screw 64.

The disc 57 is provided with a series of graduations such as 65, 66 and 67 which are adapted to be registered with the openings 56, 56$^a$ and 56$^b$, as the disc 57 is moved with respect to the fixed disc 54. A pointer 68 is connected to the sprocket 38 and its outer end extends along the front edge of the disc 54 which is at this point provided with a series of graduations.

In the operation of the device for ordinary weighing, the movable pan 47 is moved to the left end of the weighing bar 36 on its track 42. It is shown in this position in Fig. 1. This is the zero position of the pan which means that the indicator 68 will point to the zero graduation on disc 54. The movable pan 47 and its carriage 46 are exactly counterbalanced by the balance weight 45 at this position and at all other positions because of the chain 40 which, of course, causes the balance weight 45 always to move the same distance as, and in the opposite direction from, the movable pan and its carriage. The fixed pan 48 and its bracket member 49 play no part in counterbalancing movable pan 47, but the bracket member 49 is carefully positioned on the track 42 so that the distance from the pivot point of the system, which in the drawing is the pivot 19 of the weighing beam 18, to the movable pan at its zero position and the fixed pan 48 is equal. Once this position is determined, the bracket member 49 is fixed and never moved unless the system gets slightly out of adjustment as explained later. The fixed pan 48 is counterbalanced merely by the excess weight of the counting mechanism upon the opposite side of the pivot point 19. It will thus be seen that regardless of the position of movable pan 47, as long as both pans are empty, the counting mechanism is perfectly balanced in relation to pivot 19 and the ordinary weighing may be done by means of the indicator arm 15 without any consideration of the counting mechanism.

When a number of articles in a container are to be counted as well as weighed, the empty container is preferably placed on the platform 10, its weight being indicated by the indicator 15 and then the tare weight 37 is moved along the bar 36 until the indicator 15 is brought back to zero. The quantity of articles are then placed in the container on the platform and one of the articles is placed in the pan 47 which is brought to its zero position and in the pan 48, which is at its fixed position. The weight of the articles will be indicated by the arm 15 because the balance of the weighing beam remains undisturbed, due to the fact that the articles placed in fixed pan 48 exactly counterbalance the articles in movable pan 47 when said pan 47 is at its zero position, the two pans being equally distant from the pivot point of the weighing beam at this position. As the movable pan 47 at the zero position is not directly under the pivot of the weighing beam, it will be understood that an article placed therein must be counterbalanced to have the arm 15 indicate the correct weight of the articles on the platform. The pan 47 is then moved to the right along its track and if the arm 15 is not brought back to zero before the pan is moved to the extreme right hand position, then the pan is moved back to zero and another article is placed in each of the pans 47 and 48. At the same time disc 57 is moved by the knob 62 to bring the proper graduations on it in alignment with the apertures 56, 56ª and 56" to indicate the new scale of numbers for two articles in each pan. The pan 47 is then moved to the right until the arm 15 is brought back to zero. It will be assumed that with two articles in each pan the number of articles is within the capacity of the counting mechanism and consequently when the indicator 15 is brought back to zero the pointer 68 has traveled over the face of disc 54, the graduation opposite which it is disposed representing the number of articles in the container. Of course if the number of articles in the pans are still not sufficient to bring the arm 15 back to zero within the limit of movement of the pan 47, the number of articles is correspondingly increased.

By having the counting discs associated with the movement of the connection or chain 40, the count is automatically indicated as the pan 47 is moved, the original setting of the movable disc being determined by the number of articles in each pan. It may be that after the device has been used for some time the bearings will wear a little or the balance will be disturbed slightly for one reason or another and to overcome this the normally fixed pan 48 can be slightly adjusted on its track to counteract any slight change in the normal position of pan 47. By having the entire counter mechanism mounted in association with the weighing bar or beam 36 and having no other connection with the scale itself than through said bar, it is apparent that practically no alterations in the construction or arrangement of the device as a weighing scale is necessary to add to it the function of a counting mechanism. This simplicity therefore permits some types of standard scales to be adapted as counting devices which otherwise could not be effected.

By the term "zero position" as used in the claims is meant one end of the path along which the movable article receptacle is to travel. Generally this position will be at one end or the other of the longest path which the movable receptacle is capable of travelling and the indicator will point to the zero graduation of the counting means at such position. However, this term is also intended to cover one end or the other of any path selected for the movable pan to travel, regardless of whether said pan is capable of travelling a longer path or not.

I claim:

1. In combination with a weighing beam, a counting mechanism supported entirely therefrom, comprising rotatable members disposed on the beam, an element movable relative to the fulcrum of the beam connecting said members, an article receptacle connected to said element, means for automatically counteracting the effect of the weight of the receptacle when the latter is moved relative to the fulcrum, a pointer moved by one of said members and a stationary counting disc over which said pointer moves.

2. In combination with a weighing beam, a counting mechanism supported from said beam and comprising rotatable members disposed at the ends of the beam, a flexible element connecting said members, a movable article pan connected to said element, means for automatically counteracting the effect of the weight of said pan when the latter is moved, a pointer on one member, a graduated apertured stationary disc over which said pointer moves, a manually movable disc adjacent said stationary disc and having graduations thereon adapted to be moved to view through the apertures in the stationary disc to indicate a change in value of the graduations on said stationary disc as the number of articles in the pan are changed.

3. In combination with a weighing beam, a counting mechanism supported from said weighing beam, and comprising rotatable members disposed at the ends of the beam, a flexible element connected to said members, a balance weight connected to said element, a movable article pan connected to said element, a pointer on one member, and a graduated stationary disc over which said pointer moves.

4. In combination with a weighing beam, a counting mechanism supported from said weighing beam, and comprising rotatable members disposed at the ends of the beam, a flexible element connected to said members, a balance weight connected to said element, a movable article pan connected to said element, a pointer on one member, a graduated stationary disc over which said pointer moves, said disc being apertured, a manually movable disc back of said stationary disc and having graduations thereon which can be brought into view through said apertures to indicate a change in value of the graduations on the stationary disc as the number of articles in the pan are changed.

5. In combination with a weighing beam, a counting mechanism supported from said weighing beam and comprising rotatable members connected to the ends of the beam, a flexible element connecting said members, a pair of tracks, a balance weight and a movable article pan connected to the element, said weight sliding on one of said tracks and the movable article pan sliding on the other, a fixed article pan connected to one of said tracks, a pointer on one of said members, a graduated stationary apertured disc over which said pointer moves, a manually movable disc back of said stationary disc having graduations which can be brought into view through said apertures to indicate a change in value of the graduations on the stationary disc as the number of articles in the pans are changed.

6. The combination with a scale having a weighing beam, of an article receptacle movable relative to the fulcrum of said beam, means for automatically counteracting the effect of the weight of said receptacle when the latter is moved relative to the fulcrum, a second article receptacle fixed with relation to the fulcrum, the movable receptacle at its zero position and the fixed receptacle being equidistant from the fulcrum and on opposite sides, the two receptacles being supported by the beam.

7. The combination with a scale having a weighing beam, of rotatable members disposed on the beam, an element movable relative to the fulcrum of the beam connecting said members, an article receptacle connected to said element, means for automatically counteracting the effect of the weight of said receptacle when the latter is moved relative to the fulcrum, a pointer moved by one of said members, a stationary counting disc over which said pointer moves and a second article receptacle fixed with relation to the fulcrum, the movable receptacle at its zero position and the fixed receptacle being equidistant from the fulcrum and on opposite sides, both receptacles being supported by the beam.

Signed at New York, in the county of New York, and State of New York, this 12th day of August, A. D. 1927.

HUGH M. CAMERON.